(12) United States Patent
Boyns et al.

(10) Patent No.: US 8,676,970 B2
(45) Date of Patent: Mar. 18, 2014

(54) METHODS AND SYSTEMS FOR MANAGING DEVICE SPECIFIC CONTENT

(75) Inventors: Mark R. Boyns, Alpine, CA (US); Jonathan K. Kies, Encinitas, CA (US)

(73) Assignee: QUALCOMM Incorporated, San Diego, CA (US)

( * ) Notice: Subject to any disclaimer, the term of this patent is extended or adjusted under 35 U.S.C. 154(b) by 124 days.

(21) Appl. No.: 13/327,435

(22) Filed: Dec. 15, 2011

(65) Prior Publication Data
US 2012/0191844 A1 Jul. 26, 2012

Related U.S. Application Data

(60) Provisional application No. 61/424,624, filed on Dec. 18, 2010.

(51) Int. Cl.
*G06F 15/16* (2006.01)
*G06F 12/00* (2006.01)

(52) U.S. Cl.
USPC ......................................................... 709/224

(58) Field of Classification Search
USPC .................. 709/203, 217–218, 223–229, 250
See application file for complete search history.

(56) References Cited

U.S. PATENT DOCUMENTS

| | | | |
|---|---|---|---|
| 7,778,591 B1 * | 8/2010 | Van Hoff et al. | 455/2.01 |
| 7,805,453 B2 | 9/2010 | Ostrover | |
| 8,250,012 B1 * | 8/2012 | Whitman et al. | 706/45 |
| 8,370,952 B1 * | 2/2013 | Wieder | 726/26 |
| 2003/0033209 A1 | 2/2003 | Minear et al. | |
| 2004/0009813 A1 * | 1/2004 | Wind | 463/30 |
| 2004/0043763 A1 | 3/2004 | Minear et al. | |
| 2004/0205164 A1 | 10/2004 | Jacobs et al. | |
| 2006/0080659 A1 | 4/2006 | Ganji | |
| 2006/0256012 A1 | 11/2006 | Fok et al. | |
| 2010/0121705 A1 | 5/2010 | Ramer et al. | |
| 2010/0166063 A1 * | 7/2010 | Perlman et al. | 375/240.07 |
| 2013/0114530 A1 * | 5/2013 | Chen et al. | 370/329 |

FOREIGN PATENT DOCUMENTS

WO WO2008073594 A1 6/2008

OTHER PUBLICATIONS

International Search Report and Written Opinion—PCT/US2011/065698—ISA/EPO—Jun. 15, 2012.
Adzic et al.,"A Survey of Multimedia Content Adaptation for Mobile Devices", Mutltimedia Tools Appl., vol. 51, Issue 1, pp. 379-396 (Jan. 2011).

* cited by examiner

*Primary Examiner* — Zarni Maung
(74) *Attorney, Agent, or Firm* — Fariba Yadegar-Bandari

(57) ABSTRACT

Methods and apparatus for managing content may include receiving feedback information for content associated with a device having a set of device characteristics. The methods and apparatus may further include determining a compatibility rating of the content based on the feedback information. The methods and apparatus may also include providing a message based on a portion of the compatibility rating of the content for an other device having a portion of the set of device characteristics.

59 Claims, 11 Drawing Sheets

METHODS AND SYSTEMS FOR MANAGING DEVICE SPECIFIC CONTENT

CLAIM OF PRIORITY UNDER 35 U.S.C. §119

The present Application for Patent claims priority to Provisional Application No. 61/424,624 entitled "Content Distribution System" filed Dec. 18, 2010, and assigned to the assignee hereof and hereby expressly incorporated by reference herein.

BACKGROUND

With the proliferation of wireless devices that have increased power, memory, and other features, more and more wireless devices are being used for entertainment purposes, including for executing content such as games, movies, and audio. In addition, these wireless devices may be used for content, such as applications, which may be targeted at productivity purposes, including e-mail, navigation, and location based services. A large number of content are provided by third-party developers, and distributed over a wireless communication system by the system operator. Some of these applications are tested and confirmed to work on particular wireless devices and/or wireless device configurations (e.g., versions of an operating system, hardware, or firmware), while others are not. Content may not be tested on all devices by developers because the costs of testing content on the range of devices in the market can become very expensive and often prohibitively expensive, especially for small developers.

Thus, in a content distribution system that serves various types of mobile devices associated with various network operators, often times content offered for download does not function on a given device because of differences in content requirements and device capabilities. Further, related art systems attempt to maintain mappings between device types and compatible content and/or content upgrades, however, maintaining an accurate mapping is very complicated and time consuming, resulting in an administrative nightmare. Therefore, users of wireless devices sometimes have a bad user experience, e.g. the content does not operate correctly or at all, when obtaining and attempting to use content that has not been previously tested and approved for their particular wireless device, or their particular wireless device configuration.

It would be desirable to obtain a plurality of device characteristics, which is used to filter a plurality of available content into a subset of device-specific available content that is compatible with, or particularly designated for (e.g., by a network operator), the device based on comparing the plurality of device characteristics with positive feedback, such as reviews and ratings, from other users with the same or similar devices. It would also be desirable to determine device-specific available content based upon successful content usage tracking on devices with the same or similar device characteristics.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

One aspect relates to a method of managing content. The method may include receiving feedback information for content associated with a device having a set of device characteristics. The method may also include determining a compatibility rating of the content based on the feedback information. In addition, the method may include providing a message based on a portion of the compatibility rating of the content for an other device having a portion of the set of device characteristics.

Another aspect relates to at least one processor configured to manage content. The processor may include a first module for receiving feedback information for content associated with a device having a set of device characteristics. In addition, the processor may include a second module for determining a compatibility rating of the content based on the feedback information. The processor may further include a third module for providing a message based on a portion of the compatibility rating of the content for an other device having a portion of the set of device characteristics.

Yet another aspect relates to a computer program product. The computer program product may include a computer-readable medium including at least one instruction for causing a computer to receive feedback information for content associated with a device having a set of device characteristics. The computer readable medium may also include at least one instruction for causing the computer to determine a compatibility rating of the content based on the feedback information. The computer readable medium may additionally include at least one instruction for causing the computer to provide a message based on a portion of the compatibility rating of the content for an other device having a portion of the set of device characteristics.

Another aspect relates to an apparatus. The apparatus may include means for receiving feedback information for content associated with a device having a set of device characteristics. The apparatus may further include means for determining a compatibility rating of the content based on the feedback information. Moreover, the apparatus may include means for providing a message based on a portion of the compatibility rating of the content for an other device having a portion of the set of device characteristics.

Yet another aspect relates to an apparatus for managing content. The apparatus may include a feedback data store operable to receive feedback information for content associated with a device having a set of device characteristics. In addition, the apparatus may include a compatibility component operable to determine a compatibility rating of the content based on the feedback information. The apparatus may also include a presenting component operable to provide a message based on a portion of the compatibility rating of the content for an other device having a portion of the set of device characteristics.

Another aspect relates to a method for providing content feedback information. The method may include accessing one or more content on a wireless device. The method may further include generating feedback information for the one or more content. Moreover, the method may include forwarding the feedback information along with one or more device characteristics for the wireless device for processing.

Still another aspect relates to at least one processor configured to provide content feedback information. The processor may include a first module for accessing one or more content on a wireless device. The processor may also include a second module for generating feedback information for the one or more content. In addition, the processor may include a third module for forwarding the feedback information along with one or more device characteristics for the wireless device for processing.

Another aspect relates to a computer program product. The computer program product may include a computer-readable medium including at least one instruction for causing a computer to access one or more content on a wireless device. The computer-readable medium may also include at least one instruction for causing the computer to generate feedback information for the one or more content. The computer-readable medium may further include at least one instruction for causing the computer to forward the feedback information along with one or more device characteristics for the wireless device for processing.

Yet another aspect relates to an apparatus. The apparatus may include means for accessing one or more content on a wireless device. The apparatus may further include means for generating feedback information for the one or more content. In addition, the apparatus may include means for forwarding the feedback information along with one or more device characteristics for the wireless device for processing.

Another aspect relates to an apparatus for providing content feedback information. The apparatus may include an access component operable to access one or more content on a wireless device. The apparatus may also include a feedback component operable to generate feedback information for the one or more content. The apparatus may additionally include a forwarding component operable to forward the feedback information along with one or more device characteristics for the wireless device for processing.

Still another aspect relates to a method for a wireless device to obtain information about compatible content. The method may include sending, by a wireless device having a first set of device characteristics, a request about content. The method may further include receiving, in response to the request, a message based on a portion of a compatibility rating of the content, the compatibility rating being based on feedback information received from an other wireless device associated with the content, the other wireless device having a second set of device characteristics that includes a portion of the first set of device characteristics of the wireless device. Moreover, the method may include performing an action with respect to the content based on the message.

Another aspect relates to at least one processor configured to obtain information about compatible content. The processor may include a first module for sending, by a wireless device having a first set of device characteristics, a request about content. In addition, the processor may include a second module for receiving, in response to the request, a message based on a portion of a compatibility rating of the content, the compatibility rating being based on feedback information received from an other wireless device associated with the content, the other wireless device having a second set of device characteristics that includes a portion of the first set of device characteristics of the wireless device. The processor may also include a third module for performing an action with respect to the content based on the message.

Another aspect relates to a computer program product. The computer program product may include a computer-readable medium including at least one instruction for causing a computer to send, by a wireless device having a first set of device characteristics, a request about content. The computer-readable medium may additionally include at least one instruction for causing the computer to receive, in response to the request, a message based on a portion of a compatibility rating of the content, the compatibility rating being based on feedback information received from an other wireless device associated with the content, the other wireless device having a second set of device characteristics that includes a portion of the first set of device characteristics of the wireless device. The computer-readable medium may further include at least one instruction for causing the computer to perform an action with respect to the content based on the message.

Yet another aspect relates to an apparatus. The apparatus may include means for sending, by a wireless device having a first set of device characteristics, a request about content. The apparatus may further include means for receiving, in response to the request, a message based on a portion of a compatibility rating of the content, the compatibility rating being based on feedback information received from an other wireless device associated with the content, the other wireless device having a second set of device characteristics that includes a portion of the first set of device characteristics of the wireless device. Moreover, the apparatus may include means for performing an action with respect to the content based on the message.

Still another aspect relates to a wireless device for obtain information about compatible content. The wireless device may include a requestor component operable to send, by a wireless device having a first set of device characteristics, a request about content. In addition, the wireless device may also include an action component operable to receive, in response to the request, a message based on a portion of a compatibility rating of the content, the compatibility rating being based on feedback information received from an other wireless device associated with the content, the other wireless device having a second set of device characteristics that includes a portion of the first set of device characteristics of the wireless device and perform an action with respect to the content based on the message.

To the accomplishment of the foregoing and related ends, the one or more aspects comprise the features hereinafter described in more detail and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
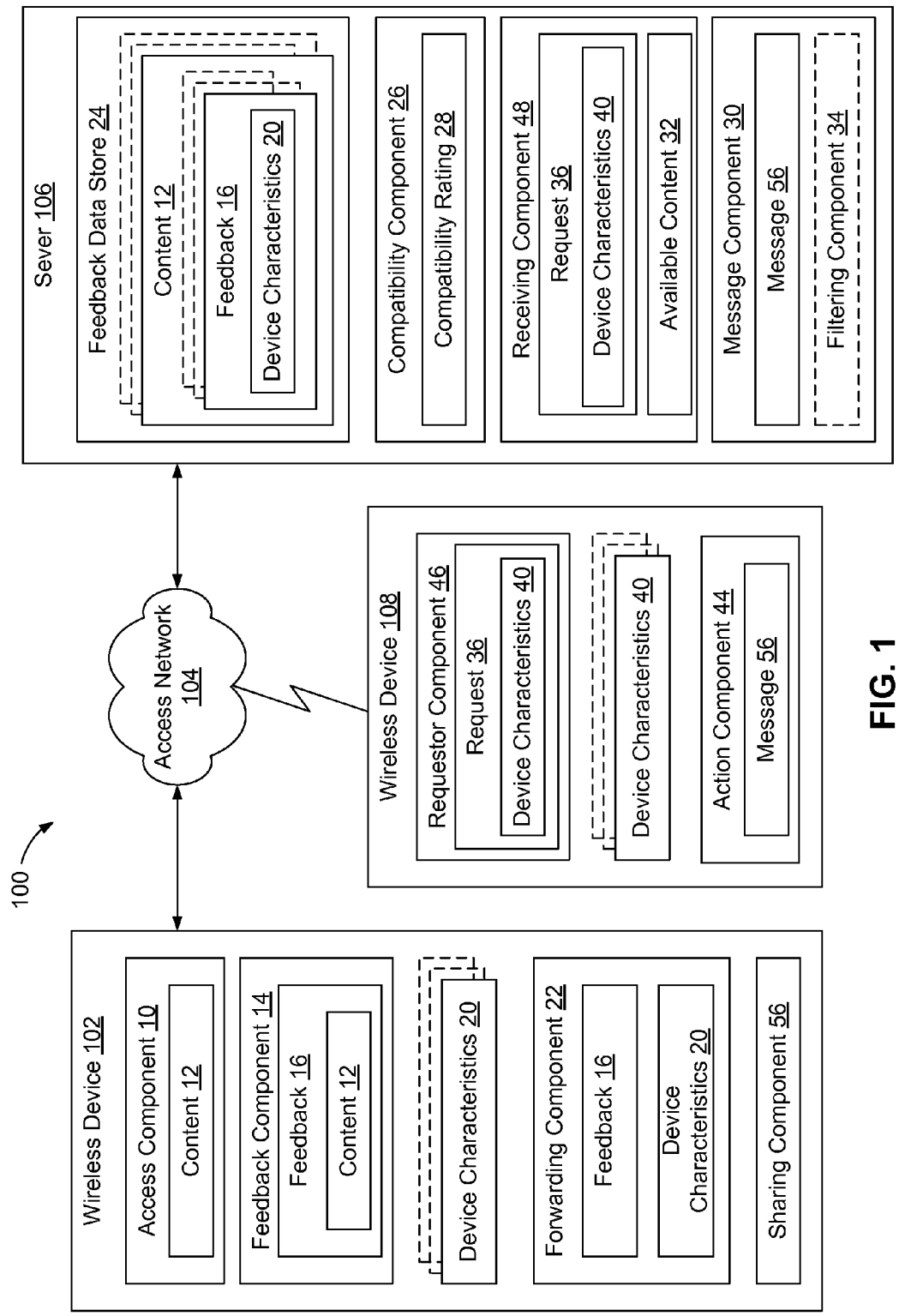
FIG. 1 is an illustration of a connectivity system in accordance with an aspect.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described aspects relate to methods and apparatus for managing content. The described aspects may help a user make decisions about content being used on a device and/or discover compatible content to use with the device based at least partially on user feedback. The described aspects may provide available content to a device, or for obtaining available content at a device. For example, available content may be filtered into a subset of device specific available content that is at least partially based on user feedback. As such, the described aspects incorporate "wisdom of the crowd" to informally approve or filter available content for a specific set of device characteristics. As used herein, the term "device characteristics" may refer to any one or any combination of wireless device type and wireless device configuration. For example, one or more available content, such as in a content store and/or content catalog, may be filtered to provide selected content to a specific wireless device type having a specific wireless device configuration, where the selected content has been determined to be compatible with and/or designated for, or has not been determined to be incompatible with, the specific wireless device type and/or the specific wireless device configuration (e.g., device specific content) at least partially based on the feedback. By filtering the available content to obtain a subset of content that is compatible with (or not incompatible with) a device, the user of the device is less likely to have a negative experience, such as the content malfunctioning on the device.

In addition, in the described aspects, device-specific content may be discovered based on comparing successful content usage on a device with the plurality of device characteristics and the requirement characteristics of each of the available content. For example, the described apparatus and methods may obtain usage data for one or more content being used on a device through reporting by the device, network-based dynamic tracking, and/or a combination thereof. Additionally, the described apparatus and methods may additionally obtain or otherwise correlate the specific set of device characteristics with the received usage data.

Thus, the described aspects correlate the feedback information and device characteristics to determine a compatibility rating in order to avoid formal testing and approval of content for a plurality of different devices, and a plurality of different sets of device characteristics for each of the plurality of devices. As a result, an informal compatibility rating is determined, thereby saving significant cost and resources that would otherwise be required to formally determine the compatibility rating.

As used herein, the term "content" includes, at least, one or more of any type of application, multimedia file, image file, executable, program, web page, script, document, presentation, message, data, meta-data, music, video, electronic book, ringtone, wallpaper, an electronic representation of a physical item, language, typeface, character set, or any other type of media or information that may be rendered, processed, or executed on a device.

Referring now to FIG. 1, illustrated is an example connectivity system 100 that includes one or more wireless devices 102 communicating through one or more access networks 104 with one or more servers and/or computing devices 106 in order to access and/or receive content 12 and provide feedback information 16 for the accessed and/or received content 12. The provided feedback information 16 may be associated with one or more device characteristics 20 of wireless device 102 and may be used by server 106 to determine a compatibility rating 28 based upon the received feedback information 16.

Server 106 may further receive a request 36 from an other wireless device 108 to access and/or receive content. For example, wireless device 108 may send request 36 to server 106 to receive a content catalog or store. Request 36 may include at least one device characteristic 40 of wireless device 108. Server 106 may receive the one or more device characteristics 40 of wireless device 108 and may use device characteristics 40 to determine device specific available content for wireless device 108. For example, server 106 may make content 12 available based upon a compatibility rating for content 12 in relationship to a set of similar device characteristics 40 of wireless device 108. For example, device-specific available content may be discovered to be device compatible based on positive feedback, such as reviews and ratings, from other users with the same or similar device characteristics. Server 106 may forward the device-specific available content 32 to wireless device 108 for presentation in, for example, a content store and/or catalog.

Wireless devices 102, 108 may include any mobile, portable computing or communications device, such as a cellular device, that may connect to an access network 104. Wireless devices 102, 108 may be, for example, a cellular telephone, a navigation system, a computing device, a camera, a PDA, a music device, a gaming device or a handheld device having wireless connection capability, among other devices. Server/computing device 106 may include any mobile or fixed computing device connected to a network.

In addition, access network 104 may provide one or more types of communication connections, such as any type of wireless airlink, to wireless devices 102, 108, and server 106. Wireless devices 102, 108 may place and/or receive a communication, e.g., a telephone call, a conference call, a video conferencing call, an Internet Protocol session, a Voice Over Internet protocol (IP) call, a short message service (SMS) message, a multimedia messaging service (MMS) message, an instant messaging (IM) service message, a chat or net-meeting related connection, a video, music, or data transfer, among other communications, via access network 104 to and/or from one or more servers 106. In addition, wireless devices 102, 108 may receive a communication via access network 104 from one or more servers 106, or from any other device in communication with access network 104.

Wireless device 102 may include an access component 10 operable to access and/or receive content 12 from server 106. Content 12 may include but is not limited to, digital content, such as an application (e.g., weather applications, sports applications, news applications, shopping applications, or entertainment applications), games, music, or books, among other content. Components on the device that are used by the content may include, for example, a camera, a global positioning system (GPS), wireless connection capability, a larger screen size, among other components.

Wireless device 102 may also include a feedback component 14 operable to receive and/or provide feedback information 16 for content 12. Feedback information 16 may include, but is not limited to, downloaded content information, user ratings of content, user reviews of content, content usage information, and content uninstall information. Wireless device 102 may also include one or more device characteristics 20. Device characteristics 20 may include, but are not limited to, a device identification (ID), a device type/make/model, a device user interface configuration, a device processor configuration, a device runtime environment/platform/operating system, a device location, a mobile country code (MCC), a mobile network code (MNC), a device software image, and a device available memory capacity, etc., or any other hardware, software, or firmware characteristic of the device. Feedback component 14 may interface with the device characteristics 20 of wireless device 102 and associate one or more device characteristics 20 with the received feedback information 16 for content 12. For example, if the received feedback indicated that content 12 worked well with the GPS system of wireless device 102, feedback component 14 may associate the received feedback information 16 with the GPS system of wireless device 102.

Wireless device 102 may also include a sharing component 56 operable to share feedback information 16 with other users, such as but not limited to, for example, others within a social circle for the user. For example, sharing component 56 may forward the feedback information 16 of content 12 to a social circle such as other users using, for example, social media networks associated with the user of wireless device 102 and/or contact lists associated with the wireless device 102. In an aspect, sharing component 56 may post a message with the feedback information 16 for content 12 on one or more social media networks associated with the user of wireless device 102, and thus, allowing contacts associated with the social media network accounts access to the user feedback information 16. For example, the user of wireless device 102 may download a new game for use on wireless device 102 and share feedback of the game using one or more social media networks associated with the user.

Positive feedback, such as "works great on my device," may encourage other users with same or similar devices to download the game to play. Negative feedback, such as "fails" or "uninstalled after first use," may prevent other users with the same or similar devices from downloading the game to play. Other users may also provide additional comments and/or reviews on the feedback information 16, such as selecting a "like" button and/or providing additional details on how the content works. Thus, feedback information 16 may be distributed quickly to others within a social circle to help promote and/or market device specific content.

Wireless device 102 may further include a forwarding component 22 operable to forward, for example to server 106, feedback information 16 obtained or generated for one or more content 12. Server 106 may include a feedback data store 24 operable to store feedback information 16 obtained or generated for one or more content 12 from one or more wireless devices 102. In addition, feedback data store 24 may associate received feedback information 16 for content 12 with one or more device characteristics from the wireless device that provided the feedback information 16. Thus, content 12 may be associated with a variety of feedback information 16 associated with a set of device characteristics 20.

Figure 2:
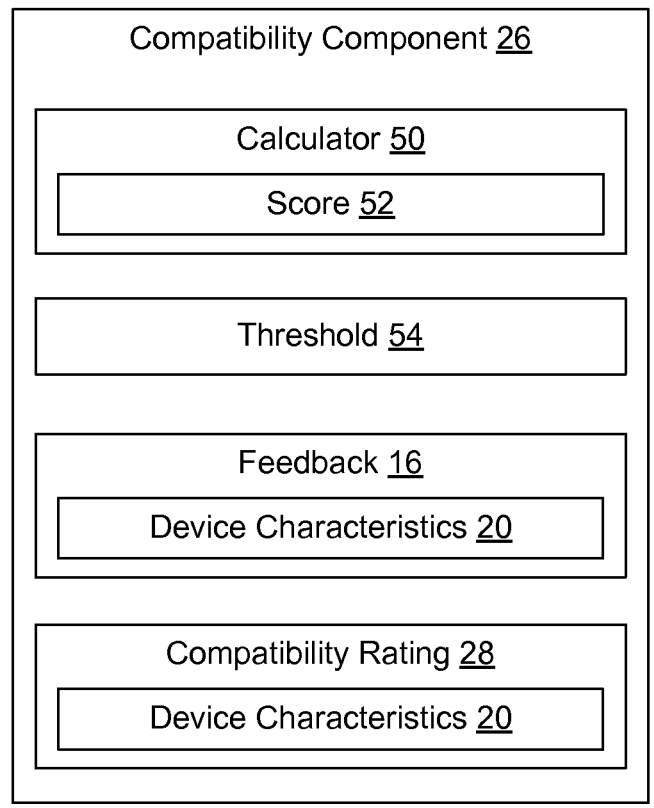
FIG. 2 is an illustration of an example compatibility component in accordance with another aspect.

Server 106 may also include a compatibility component 26 operable to determine a compatibility rating 28 for content 12 in relationship to a set of device characteristics 20. Referring now to FIG. 2, compatibility component 26 may include a calculator component 50 operable to calculate a score 52 for the received feedback information 16. In an aspect, calculator component 50 may calculate score 52 based upon the total feedback information 16 received for content 12. For example, score 52 may be based on one or any combination of user reviews, user ratings, content usage information, and/or content uninstall information from multiple wireless devices with the same or similar set of device characteristics for content, such as an application the wireless devices downloaded.

Compatibility component 26 may further include a threshold component 54 operable to generate one or more threshold levels that define the received feedback information 16 for the content 12 in relationship to the device characteristics 20. The threshold levels may define whether content 12 is compatible with wireless device 102. For example, a high threshold level may indicate a positive review for the content in relation to the set of device characteristics and may be illustrated with a green color. A medium threshold level may indicate mixed reviews for the content in relation to the set of device characteristics and may be illustrated with a yellow color. A low threshold level may indicate bad reviews for the content in relation to the set of device characteristics and may be illustrated with a red color.

Compatibility component 26 may compare the score 52 with the threshold levels to determine a compatibility rating 28 for the content 12. For example, if the score is above a positive or negative threshold limit, then the compatibility component 26 may determine that the content is respectively compatible or incompatible with the device and assign a compatibility rating 28 accordingly. Also, for example, if a threshold number of users have uninstalled the content and/or have rated the content poorly (e.g., less than 2 out of 5 stars), however, then the compatibility component 26 may determine that the content is not compatible with the device and assign a compatibility rating 28 accordingly.

The compatibility component 26 may dynamically change one or more threshold levels based upon, for example, quality control of the results (e.g., validating independently that the content works and/or does not work on the device as indicated by the compatibility rating). Thus, the threshold levels may be increased and/or decreased based upon the quality control results. In addition, a threshold number of feedback, e.g. a certain number of user ratings, may need to be received before the compatibility component 26 may be able to generate a compatibility rating 28.

Referring back to FIG. 1, server 106 may have a receiving component 48 operable to receive one or more requests 36 from one or more wireless devices 108 to access and/or receive content. For example, wireless device 108 may send request 36 to server 106 to receive a content catalog or access a content store, where request 36 includes at least one device characteristic 40 of wireless device 108. Server 106 may receive the device characteristics 40 of wireless device 108 and may use the device characteristics 40 to determine device specific available content 32 for wireless device 108. For example, server 106 may determine available content 32 based upon a compatibility rating 28 for content 12 in relationship to a set of similar device characteristics to the device characteristics 40 of wireless device 108. Receiving component 48 may interface with compatibility component 26 to determine whether content 12 with compatibility ratings 28 associated with device characteristics 20 is similar to the device characteristics 40 of wireless device 108. Receiving component 48 may add content 12 to the available content 32 based upon the determination. Thus, the available content 32 may be determined based the compatibility rating 28 from other user devices with the same or similar device characteristics.

Receiving component 48 may also interface with a message component 30 operable to forward one or more messages 56 to wireless device 108 in response to the request 36 to access and/or receive content. For example, message 56 may include available content 32. Messages may also include, but are not limited to, a list of one or more compatible content, recommendations for one or more content (e.g., delete/uninstall, upgrade, replace, etc.), a copy of the content, a stream including the content, a conversion and/or translation of the content, or a command/instruction to perform an action (e.g., render, display, present, execute, acquire, etc.) with respect to the content. Message component 30 may also interface with compatibility component 26 and feedback data store 24. In one aspect, message component 30 may be operable to forward one or more messages 56 to wireless device 108 in response to receiving feedback information 16. For example, if server 106 receives feedback information 16 about a new game application being highly rated, message component 30 may forward a message 56 to wireless device 108 recommending that wireless device 108 replace a previous game application with the new game application.

Wireless device 108 may include an action component 44 operable to receive one or more messages 56 from server 106 and perform an action with respect to the content based on message 56. Actions may include, but are not limited to, rendering, displaying, presenting, outputting, generating, executing, deleting/uninstalling, upgrading, replacing, acquiring, converting, translating, copying, or streaming.

Message component 30 may optionally include a filtering component 34 operable to include and/or exclude content from the available content 32 at least partially based on feedback information 16. In other words, message component 30 may make available a subset of all available content based on the feedback information, and/or based on one or more device characteristics of a requesting device. For example, filtering component 34 may filter the available content 32 to include selected content having a specific wireless device configuration, where the selected content has been determined to be compatible with and/or designated for, or has not been determined to be incompatible with, the specific wireless device type and/or the specific wireless device configuration (e.g., device specific content) at least partially based on feedback. By filtering the available content to obtain a subset of content that is compatible with (or not incompatible with) a device, the user of the device is less likely to have a negative experience, such as the content malfunctioning on the device.

Figure 3:
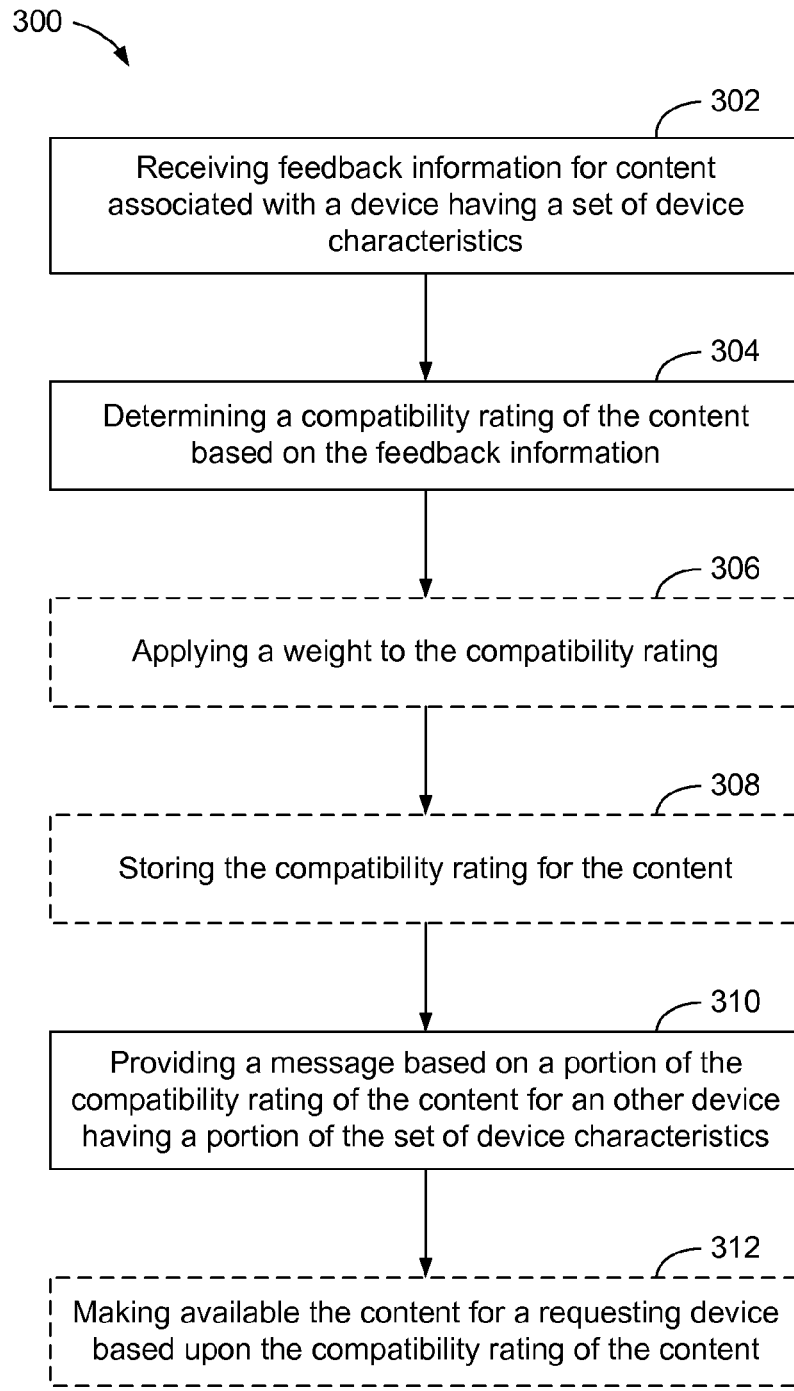
FIG. 3 is a flow chart illustrating a method for managing content in accordance with another aspect.

Referring now to FIG. 3, a method 300 for managing content in accordance with an aspect includes, at 302, receiving feedback information for content associated with a device having a set of device characteristics. For example, the device characteristics may include one or more of the following: a device identification (ID), a device type/make/model, a device user interface configuration, a device processor configuration, a device runtime environment/platform/operating system, a device location, a mobile country code (MCC), a mobile network code (MNC), a device software image, and a device available memory capacity, etc., or any other hardware, software, or firmware characteristic of the device.

In an aspect, server 106 (FIG. 1) may receive feedback information for one or more content being used on wireless device 102 (FIG. 1). Feedback information may include, but is not limited to receiving one or more of downloading content, a user rating, a user review, content usage information, or content uninstall information. In addition, server 106 may obtain usage data for one or more content being used on wireless device 102 through reporting by the device, network-based dynamic tracking, and/or a combination thereof. Server 106 may correlate the specific set of device characteristics for wireless device 102 with the received feedback information (e.g., usage data for the one or more content usage information).

Next at 304, the method may include determining a compatibility rating of the content in relationship to the set of device characteristics based upon the feedback information. In an aspect, server 106 may apply one or more algorithms to the feedback from the users or devices to determine whether particular content is compatible with at least a portion of a set of device characteristics associated with a device providing the feedback. For example, in an aspect, a plurality of compatibility ratings may be generated with each compatibility rating corresponding to a different set of device characteristics (e.g., there may be different compatibility ratings for different devices). In addition, one or more composite compatibility ratings may be generated based upon, for example, a function of each of the device-specific compatibility ratings, such as an average or a weighted value of the plurality of compatibility ratings (e.g., new ratings or newer device configurations may be weighted higher than older devices/configurations).

For example, if the user ratings of the content are above a threshold limit (e.g., a number of users have rated the application 3 out of 5 stars or above or the text of the ratings are positive), the one or more algorithms may determine that the content is compatible (or, at least, is not incompatible) with the device. Further, for example, the described aspects may identify one or more elements of a user review, e.g., keywords, which correspond to compatible content or incompatible content. For instance, keywords may include words having a positive or negative connotation, such as "works great", "crashes", "does not work", and "fails." If the identified elements are above a positive or negative threshold limit, then the one or more algorithms may determine that the content is respectively compatible or incompatible with the device. Also, for example, if a threshold number of users have uninstalled the content and/or have rated the content poorly (e.g., less than 2 out of 5 stars), then the one or more algorithms may determine that the content is not compatible with the device.

The one or more algorithms may be dynamically changed based upon, for example, one or any combination of: the popularity of the content (e.g., how many users are downloading the content, the frequency of use of the content, the amount of time spent using the content), demographics of the users rating the applications (e.g., geographic location, age, gender, etc.), and changes in device characteristics (e.g., updates and/or version changes to device software and/or firmware). Moreover, any of the above-described algorithms may be combined in order to determine a compatibility rating of the content with respect to a set of device characteristics. An example algorithm for determining a compatibility rating of the content is discussed below in FIG. 4.

The method may optionally include, at 306, applying a weight to the compatibility rating. The feedback described herein may be weighted based on a relationship between a source of the feedback and a user of the device requesting access the content store or catalog. For example, feedback from users within the same social network of the user of the device may be given a higher weight as compared to feedback from other users have no relation to the user of the device. For instance, content that has been positively reviewed from friends of the device user may be placed higher in the content store or catalog than other content that has been positively reviewed by complete strangers.

In addition, the method may optionally include, at 308, storing the compatibility rating for the content. The compatibility rating for the content may be stored, for example, in relationship to the set of device characteristics. In an aspect, server 106 may correlate the specific set of device characteristics with the received usage data and store the compatibility rating in relationship to the correlated set of device characteristics.

The method may also include, at 310, providing a message based on a portion of the compatibility rating of the content for an other device having a portion of the set of device characteristics. The message may include, but is not limited to, a list of one or more compatible content, recommendations for one or more content (e.g., delete/uninstall, upgrade, replace, etc.), a copy of the content, a stream including the content, a conversion and/or translation of the content, or a command/instruction to perform an action (e.g., render, display, present, execute, acquire, etc.) with respect to the content. In an aspect, server 106 may proactively provide messages to one or more wireless devices based upon the received feedback information. For example, if the received feedback information identified content that contains malware or requires excessive permissions, server 106 may provide a message to wireless device recommending that the user of wireless device 108 uninstall the identified content based upon the received feedback that the identified content contains malware or requires excessive permissions. In addition, if the received feedback information indicates that a new weather application was highly rated for a device, server 106 may forward a message recommending that the user of wireless device 108 replace a previous weather application with the new weather application. Also, as noted above, there may be a plurality of compatibility ratings each associated with a different set of device characteristics, and/or there may be one or more composite compatibility ratings based on the plurality of compatibility ratings. As such, the message based on a portion of the compatibility rating may be based on one of the plurality of compatibility ratings, e.g. the one corresponding to a set of device characteristics determined to be a closest match to the device characteristics of the other device, or based on one or more composite compatibility ratings. Thus, the wisdom of the crowd may be used to modify content currently being used by a specific device as well as recommend content to use by the device.

At 312, the method may also include making available content for a requesting device based upon the compatibility rating of the content in relationship to the set of device characteristics. Server 106 may determine device-specific available content that may be compatible (or not incompatible) based on feedback, such as reviews, ratings, and/or usage information, from other users or devices with the same or similar device characteristics. For example, if a user of wireless device 108 sends a request to browse game applications in a content store and/or catalog, server 106 may only include game applications in the content store and/or catalog that are determined to be compatible with the set of device characteristics of wireless device 108.

In another aspect, besides either including or excluding one or more content, the feedback may be used to order the presentation of content to a specific device. For example, the content displayed in content store and/or catalog, as presented to a specific device, may be ordered based upon the feedback correlated to the device characteristics of the specific device. For instance, content that has a relatively large amount of positive feedback, e.g., that has been highly reviewed and approved, with respect to a particular set of device characteristics may be placed in a prominent location, e.g., at the top of the list, in a content store and/or catalog. In contrast, content that has poor feedback, e.g., that has been poorly reviewed and/or uninstalled, may be inconspicuously presented, e.g., placed in a significantly lower portion of the list, in the content store and/or catalog and/or removed entirely from the content store and/or catalog with respect to at least the given set of device characteristics.

In an aspect, the actual usage data of the content captured by the described apparatus and methods may be used in determining the placement of the content in the content store or catalog. For example, content that is frequently used by a number of users may be placed higher in the content store or catalog than content that is not as frequently used. In addition, the actual usage data of the content may also be used in combination with the feedback, e.g., user ratings and reviews, when determining the placement of the content in the content store or catalog.

Figure 4:
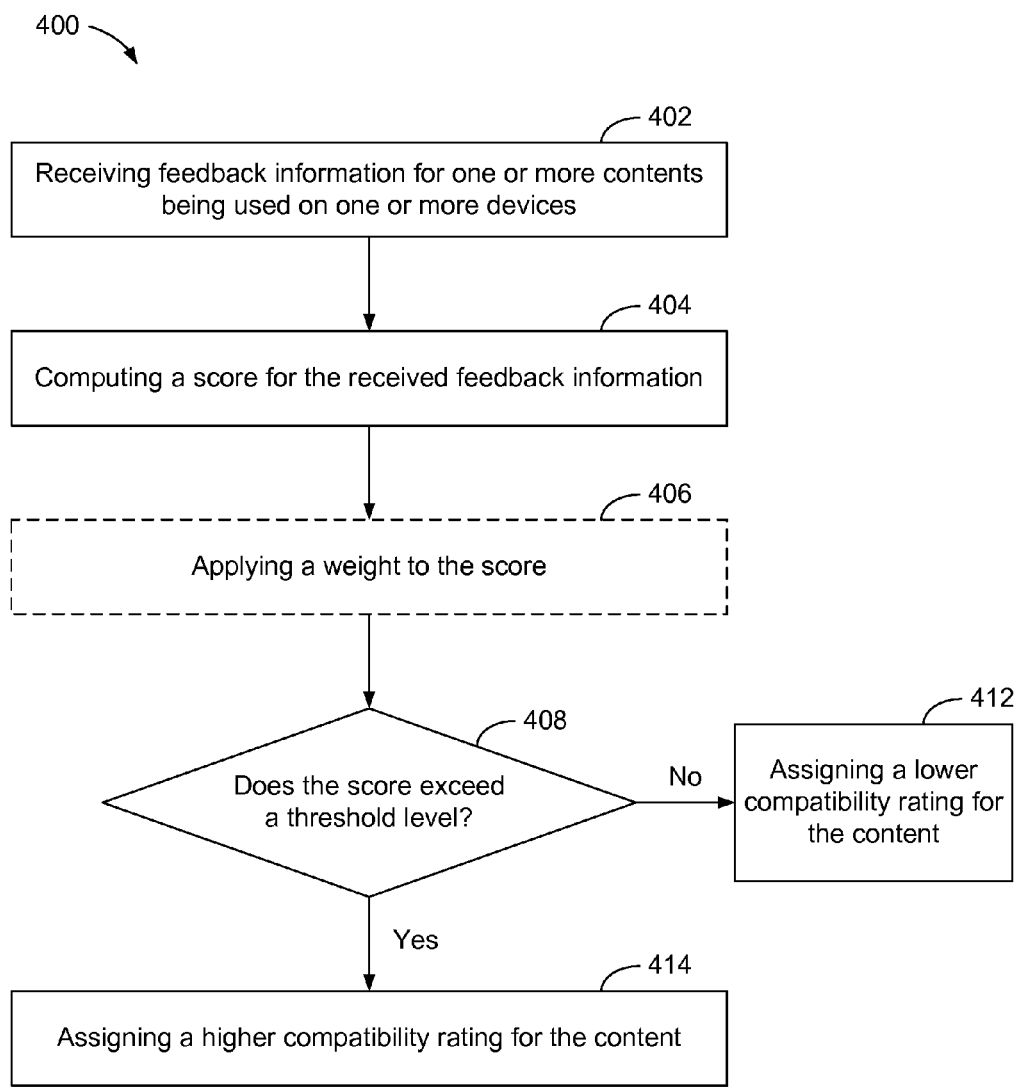
FIG. 4 is a flow chart illustrating a method for determining a compatibility rating of content in accordance with yet another aspect.

Referring now to FIG. 4, a method 400 for determining a compatibility rating for content in accordance with an aspect includes, at 402, receiving feedback information for one or more content being used on one or more devices. Feedback information may include, but is not limited to downloading of the content, user ratings of the content, user reviews of the content, content usage information, and content uninstall information. For example, server 106 may receive from the user feedback information for content being used by the user of wireless device 102. In addition, server 106 may also obtain usage data for one or more content being used on wireless device 102 through reporting by the device, network-based dynamic tracking, and/or a combination thereof.

At 404, the method may include computing a score for the received feedback information. In one use case, if the feedback information is a user rating, such as rating values of 1 to 5 stars, the server may use factors to compute the user ratings into an overall score for the content. Factors may include, but are not limited to, the number of ratings for the content and the weighting for each star value. For example, server 106 may convert the rating value to a number between 0 and 1 and compute a score for the content based upon a sum of the received rating values.

One use case may include feedback information involving user reviews of content, such as text entries reviewing the content. For example, server 106 may identify one or more elements of a user review, e.g., keywords, which correspond to compatible content or incompatible content. For instance, keywords may include words having a positive connotation, such as "works great", "cool", "loved", and "nice." Keywords may also include words having a negative connotation, such as "crashes", "does not work", "fails", "hated", "lame", and "horrible." Server 106 may analyze the text of the review for the keywords and compute a score between 0 and 1 based upon the number of positive and/or negative terms in the reviews for the content.

In an aspect, keywords may also be used to determine whether content is appropriately classified and/or whether the content should be displayed on a device (e.g., a child device with parental controls). For example, server 106 may analyze the text of reviews and determine that the content should not be presented to a device based upon one or more terms found in the review. For example, if the reviews of the content include terms, such as "violent", "dirty", or "abuse," the server may determine the content is not appropriate for a child device, and therefore, may prevent the content from being displayed in a content store and/or content catalog of devices for children. In another example, if the reviews of the content identify a language for the content, e.g., "Spanish," the server may remove the content from an "English" catalogue of content. The server may also use the keywords from a user review to determine whether the content should be presented to devices within a location, such as a country.

Another use case may include feedback information including content usage information, such as usage metrics. Usage metrics may include, but are not limited to, frequency of use of the content (e.g., multiple uses in a day, one use per week, one use per month) and duration of use for the content (e.g., amount of time a user spends using the content). For example, server 106 may periodically track the current content usage information of one or more applications on wireless device 102, e.g., based on tracking network downloads or other interactions with the device and/or with the content on the device.

Server 106 may receive content usage information and compute a score between 0 and 1 based upon the usage information. For example, content that is used more frequently (e.g., applications that are used multiple times during a day) may result in a higher computed score. In addition, content that is used less frequently but for a long duration of time (e.g., applications that are used once a week but for an hour) may result in a higher computed score.

Yet another use case may include feedback information including content installation information. For example, in the reporting aspect, upon uninstalling content from wireless device 102, the device may provide a message that includes the content usage information, e.g., frequency and/or duration of use of the content, to server 106. In an aspect, if the content was uninstalled within a short time period from the content install (e.g., below an uninstall time period threshold level), the server may compute a lower score for the feedback information. If the content was uninstalled within a long time period from the content install (e.g., above an uninstall time period threshold level), the server may compute a higher score for the feedback information. For example, the server may compute a score between 0 and 1 based upon the number of days the content is installed on a device.

In addition, content usage information (e.g., never used, multiple uses in a day, one use per week, one use per month) may be used in combination with the time period for the content install in determining the feedback information. For example, if the content was uninstalled within a long time period from the content install, but the content was never used, the server may compute a lower score for the feedback information. If, however, the content was uninstalled within a long time period from the content install and the content was frequently used, the server may compute a higher score for the feedback information.

It should be noted that the outliers may be removed when computing the score for the feedback information. For example, the highest and lowest ratings may be removed from the computation in order to prevent potential skewing of the score based on outlier feedback information. Another example may include discarding uninstall times for content based upon usage metrics (e.g., if the content was never used, the uninstall time may be discarded).

In addition, it should be noted that a user may provide one or more types of feedback information (e.g., one or more of user ratings, user review, and content uninstall information) for content. For example, upon uninstalling content from the device, a user may be prompted to select a reason for the uninstall, such as the content does not work properly on the device, the device does not have a component that is used by the content, or the user did not like using the content. The feedback received by the user when uninstalling the content may be used in combination with the content usage information to determine the score for the content. Thus, it should be noted that the score may be derived from a variety of feedback received for the content.

The method may optionally include, at 406, applying a weight to the score. In an aspect, some types of feedback information may have a higher weight relative to other types of feedback information. Example weights may include, but are not limited to, user ratings and content usage information may have a weight of 30%, content installation information may have a weight of 20%, and user reviews may have a weight of 10%. Server 106 may apply the appropriate weight to the score computed for the feedback information. For example, the server may multiple the score generated for the user ratings by 30% and multiple the score generated for user reviews by 10%. The server may combine the weighted scores together to generate a weighted score based upon the feedback information received for the content.

At 408, the method may determine whether the score for the feedback information exceeds a threshold level. The threshold level may determine whether the content may be compatible on the device. When the score exceeds the threshold level, at 410, the method may include assigning a higher compatibility rating for the content based upon the score. For example, if the score is above 80, server 106 may determine that the content is highly likely to work on wireless device 102, and therefore, assigns a high compatibility rating to the content for wireless device 102.

When the score is below the threshold level, at 412, the method may include assigning a lower compatibility rating for the content based upon the score. For example, if the score is below 40, server 106 may determine that the content may not work on wireless device 102, and therefore, assigns a low compatibility rating to the content for wireless device 102.

In an aspect, an individual, such as the user of the wireless device and/or a content provider may set the threshold level for determining the compatibility rating for the wireless device. For example, a content provider may set a higher threshold level to generate some false negatives (e.g., the content appears to not work on the device even if the content is compatible with the device) so that the content that is made available to the device is more likely to work with the device than if the threshold level was set at a lower level. In contrast, if a content provider was okay with the content not working for some devices, the content provider may set a lower threshold level and therefore may generate some false positives for content working on devices (e.g., content that may not work on the device even though the compatibility rating indicates otherwise).

Figure 5:
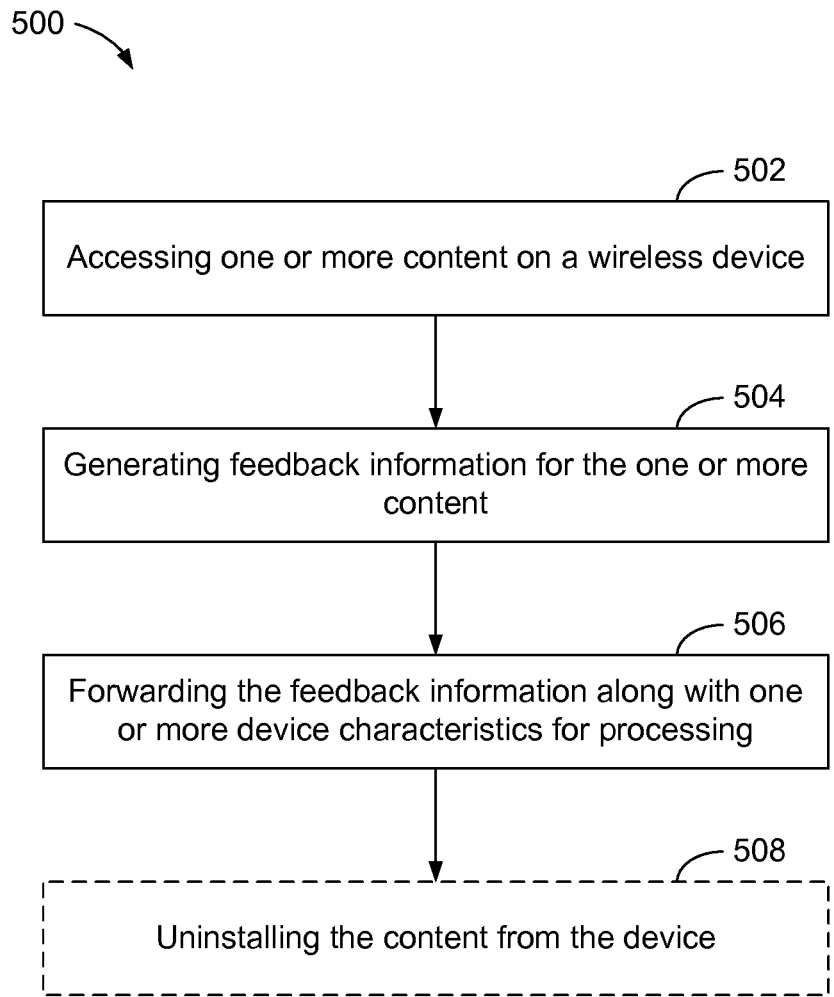
FIG. 5 is a flow chart illustrating a method for providing content feedback information in accordance with an aspect.

Referring now to FIG. 5, a method 500 for providing feedback information for content in accordance with an aspect includes, at 502, accessing one or more content on a wireless device. For example, wireless device 102 may download from server 106 an application to use on wireless device 102.

At 504, the method may include generating feedback information for the one or more content. Feedback information may include, but is not limited to receiving one or more of downloading content, a user rating, a user review, content usage information, or content uninstall information. For example, a user of wireless device 102 may rate the application by providing, for example, a three star rating.

At 506, the method may include forwarding the feedback information along with one or more device characteristics for processing. For example, wireless device 102 may forward the feedback information for one or more content being used on wireless device, along with one or more device characteristics to server 106. In addition, server 106 may obtain usage data for one or more content being used on wireless device 102 through reporting by the device, network-based dynamic tracking, and/or a combination thereof. In another aspect, wireless device 102 may forward user reviews and/or ratings to server 106.

The method may optionally include, at 508, uninstalling one or more content from the device. For example, upon uninstalling content from wireless device 102, wireless device 102 may provide a message to server 106 that includes the content usage information, e.g., frequency and/or duration of use of the content.

Figure 6:
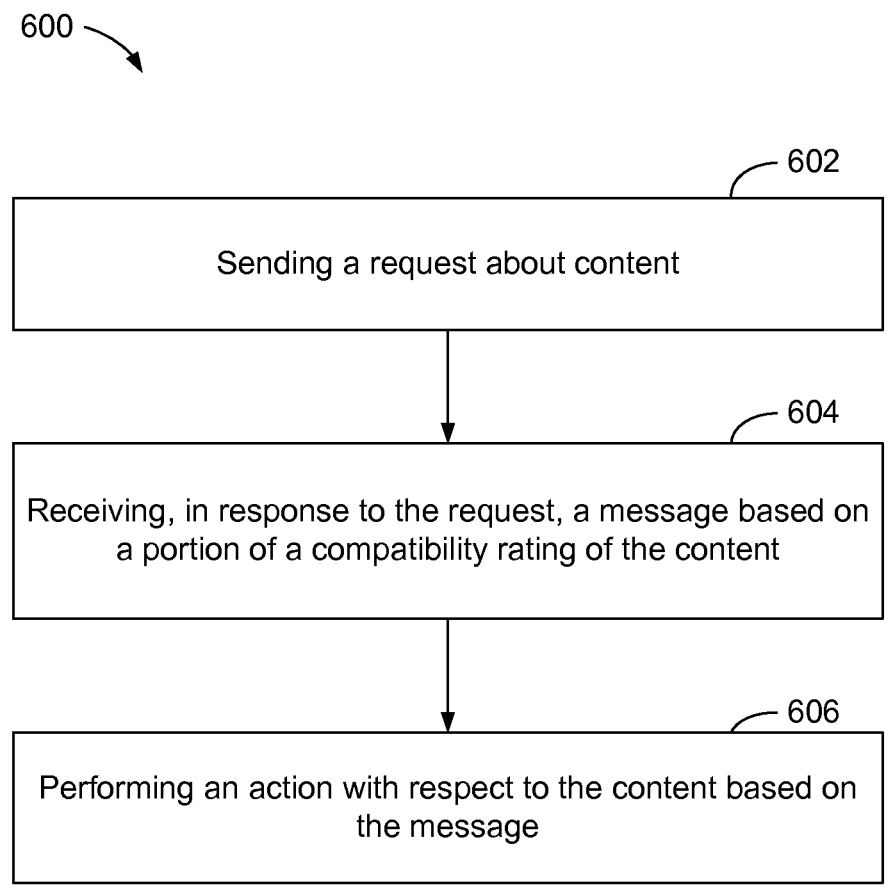
FIG. 6 is a flow chart illustrating a method for obtaining information about compatible content in accordance with another aspect.

Referring now to FIG. 6, a method 600 for obtaining information about compatible content in accordance with an aspect includes, at 602, sending, by a wireless device having a first set of device characteristics, a request about content. Wireless device 108 may send a request to sever 106 to access a content store or catalog, for example, to browse game applications.

At 604, the method may include receiving, in response to the request, a message based on a portion of a compatibility rating of the content, the compatibility rating being based on feedback information received from an other wireless device associated with the content, the other wireless device having a second set of device characteristics that includes a portion of the first set of device characteristics of the wireless device. The message may include, but is not limited to, a list of one or more compatible content, recommendations regarding one or more content (e.g., delete/uninstall, upgrade, replace), a conversion and/or translation of the content, a copy of the content, a stream including the content, or a command and/or instruction to perform an action with respect to the content. For example, server 106 may provide a message with a list of one or more available content to wireless device 108 based upon a compatibility rating for content in relationship to a set of similar device characteristics of wireless device 108.

At 606, the method may include performing an action with respect to the content based on the message. Actions may include, but are not limited to, rendering, displaying, presenting, outputting, generating, executing, deleting/uninstalling, upgrading, replacing, acquiring, converting, translating, copying, or streaming In an aspect, wireless device 108 may display the received device specific content from server 106, for example, in the form of a content store and/or catalog. For example, wireless device 108 may receive from server 106 a list of game applications that are determined to be compatible with wireless device 108. The content displayed in a content store and/or catalog, as presented to a specific device, may be ordered based upon the feedback correlated to the device characteristics of the specific device. For instance, content that has a relatively large amount of positive feedback, e.g., that has been highly reviewed and approved, with respect to a particular set of device characteristics may be placed in a prominent location, e.g., at the top of the list, in a content store and/or catalog. In contrast, content that has poor feedback, e.g., that has been poorly reviewed and/or uninstalled, may be inconspicuously presented, e.g., placed in a significantly lower portion of the list, in the content store and/or catalog and/or removed entirely from the content store and/or catalog with respect to at least the given set of device characteristics.

One variation may include grouping devices together around common characteristics that may be important in determining if a piece of content will run/render (e.g., firmware versions, OS versions, display size). If a particular piece of content is determined to be "incompatible" with a particular device, then the algorithms described above could infer that the content will not function on other devices in that same cluster (e.g., devices that share common characteristics) without receiving feedback for the other devices in the same clusters. For example, if a particular piece of content requires a specific character set (e.g., Arabic, Hindi, Cyrillic, etc.) and it is determined that a particular device does not support the specific character set, the algorithms described above could infer that the content will not function on other devices in that same cluster that share a common character set.

Figure 7:
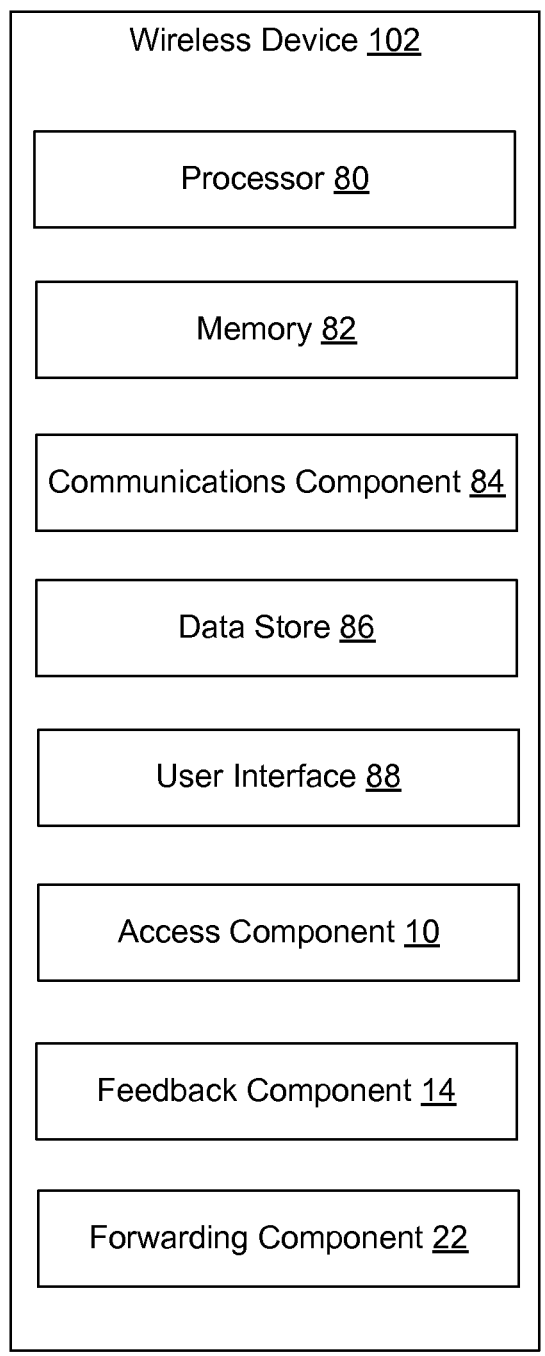
FIG. 7 is an example wireless device operable within the connectivity system in accordance with an aspect.

Referring now to FIG. 7, illustrated is an example wireless device 102 operable within the connectivity system in accordance with an aspect. In one aspect, wireless device 102 may include a processor 80 for carrying out processing functions associated with one or more of components and functions described herein. Processor 80 can include a single or multiple set of processors or multi-core processors. Moreover, processor 80 can be implemented as an integrated processing system and/or a distributed processing system.

Wireless device 102 may further includes a memory 82, such as for storing local versions of applications being executed by processor 80. Memory 82 can include a type of memory usable by a computer, such as random access memory (RAM), read only memory (ROM), tapes, magnetic discs, optical discs, volatile memory, non-volatile memory, and any combination thereof.

Further, wireless device 102 includes a communications component 84 that provides for establishing and maintaining communications with one or more parties utilizing hardware, software, and services as described herein. Communications component 84 may carry communications between components on wireless device 102, as well as between wireless device 102 and external devices, such as devices located across a communications network and/or devices serially or locally connected to wireless device 102. For example, communications component 84 may include one or more buses, and may further include transmit chain components and receive chain components associated with a transmitter and receiver, respectively, operable for interfacing with external devices.

Additionally, wireless device 102 may further include a data store 86, which can be any suitable combination of hardware and/or software, that provides for mass storage of information, databases, and programs employed in connection with aspects described herein. For example, data store 86 may be a data repository for applications not currently being executed by processor 80.

Wireless device 102 may additionally include a user interface component 88 operable to receive inputs from a user of wireless device 102 and further operable to generate outputs for presentation to the user. User interface component 88 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 88 may include one or more output devices, including but not limited to a display, a speaker, a haptic feedback mechanism, a printer, any other mechanism capable of presenting an output to a user, or any combination thereof.

Wireless device 102 may also include an access component 10 (FIG. 1) operable for accessing and/or receiving content. In addition, wireless device 102 may include a feedback component 14 operable to provide feedback associated with one or more content 12. Wireless device 102 may also include a forwarding component 22 operable to forward the provided feedback. In an aspect, user interface component 88 may transmit and/or receive messages corresponding to the operation of access component 10, feedback component 14, and/or forwarding component 22. In addition, processor 80 executes access component 10, feedback component 14, and forwarding component 22, and memory 82 or data store 86 may store them.

Figure 8:
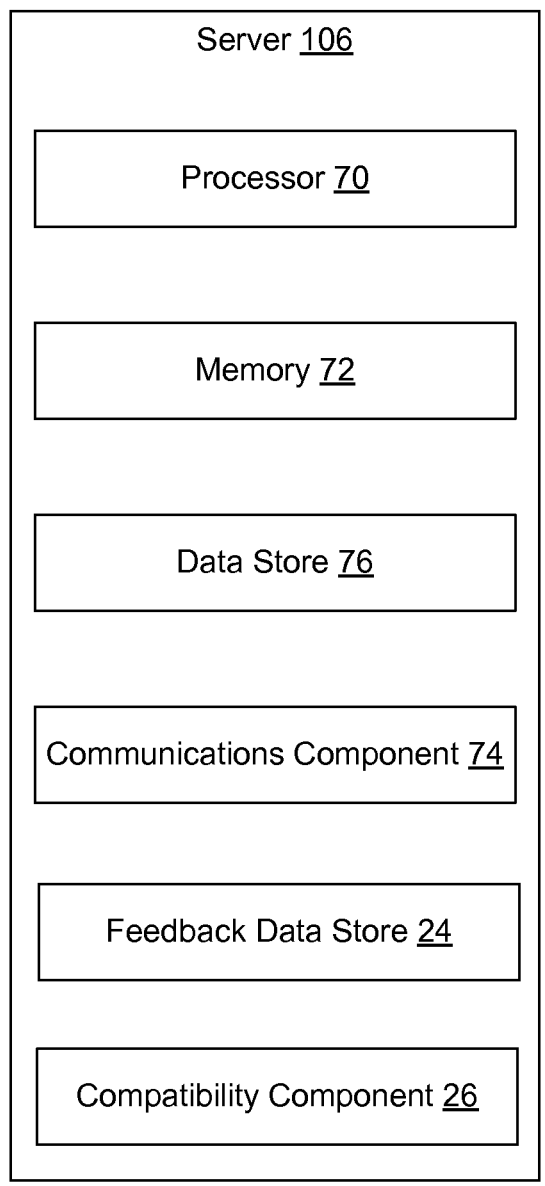
FIG. 8 is an example server device operable within the connectivity system in accordance with yet another aspect.

Referring now to FIG. 8, illustrated is an example sever device 106 operable within the connectivity system in accordance with yet another aspect. Server 106 manages network connectivity matters for access network 104. Server 106 includes processor component 70 for carrying out processing functions associated with one or more of components and functions described herein. Processor component 70 can include a single or multiple set of processors or multi-core processors. Moreover, processing component 70 can be implemented as an integrated processing system and/or a distributed processing system.

Server 106 further includes a memory 72, such as for storing local versions of applications being executed by processor component 70. Memory 72 can include random access memory (RAM), read only memory (ROM), and a combination thereof.

Further, server 106 includes a communications component 74 that provides for establishing and maintaining communications with one or more parties utilizing hardware, software, and services as described herein. Communications component 74 may carry communications between components on server 106, as well as between server 106 and external devices, such as devices located across a communications network and/or devices serially or locally connected to server 106.

Additionally, server 106 may further include a data store 76, which can be any suitable combination of hardware and/or software, that provides for mass storage of information, databases, and programs employed in connection with aspects described herein. For example, data store 76 may be a data repository for applications not currently executing.

Server 106 may also include feedback data store 24 (FIG. 1) operable for receiving and storing feedback information 16 associated with content 12. Server 106 may also include compatibility component 26 operable to provide a compatibility rating 28 to content 12 based upon the received feedback information 16. In an aspect, communications component 74 may transmit and/or receive messages corresponding to the operation of feedback data store 24 and/or compatibility component 26. In addition, processor 70 may execute feedback data store 24 and compatibility component 26, and memory 72 may store them.

Figure 9:
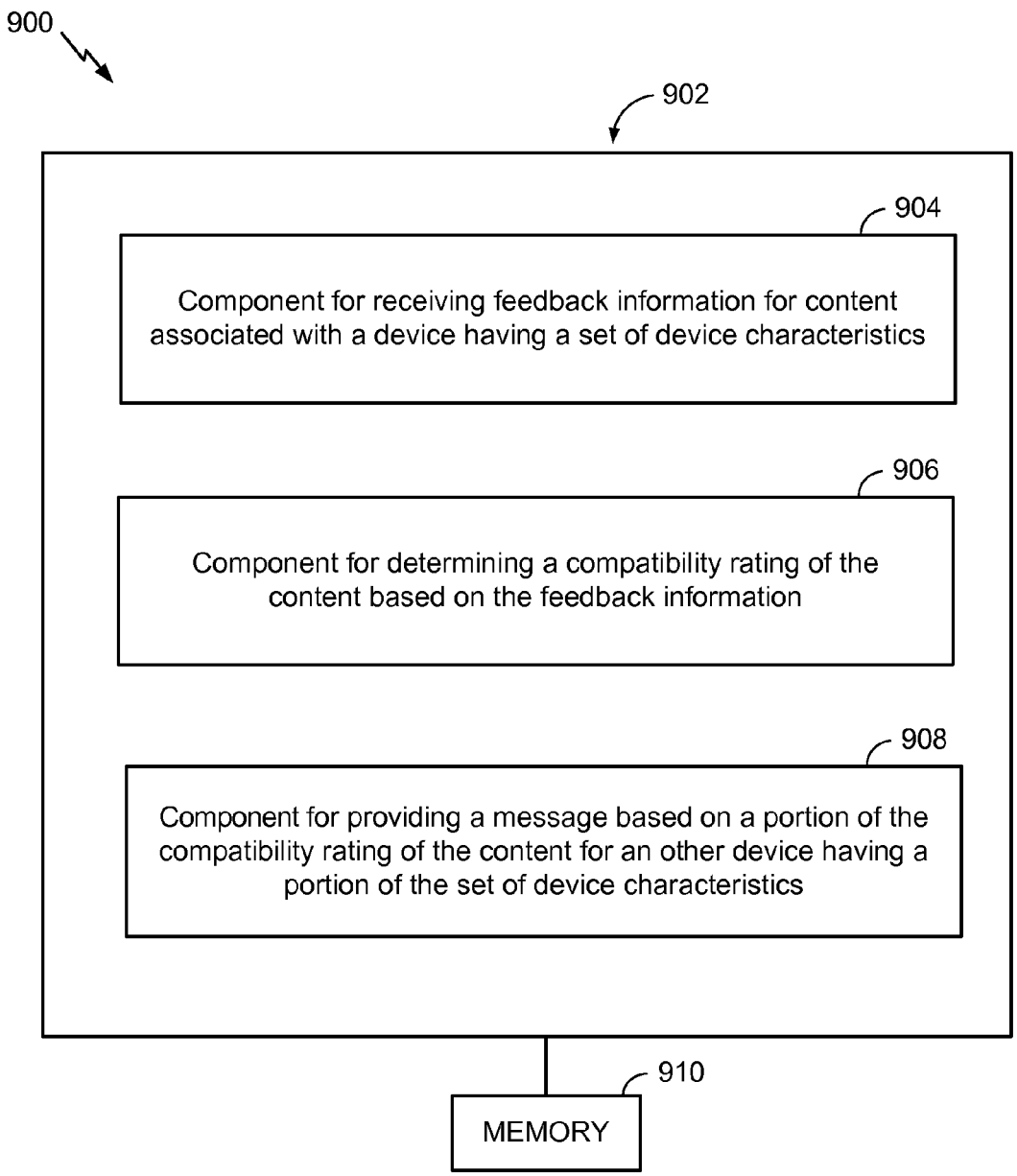
FIG. 9 is an example system that facilitates managing content in accordance with another aspect.

Referring now to FIG. 9, illustrated is a system 900 configured to manage content. For example, system 900 can reside at least partially within a transmitter, mobile device, etc. It is to be appreciated that system 900 is represented as including functional blocks, which can be functional blocks that represent functions implemented by a processor, software, or combination thereof (e.g., firmware). System 900 includes a logical grouping 902 of electrical components that facilitate managing content. For instance, logical grouping 902 may include component 904 for receiving feedback information for content associated with a device having a set of device characteristics. Further, logical grouping 902 may comprise component 906 for determining a compatibility rating of the content based on the feedback information. In addition, logical grouping 902 may include component 908 for providing a message based on a portion of the compatibility rating of the content for an other device having a portion of the set of device characteristics. Additionally, system 900 can include a memory 910 that retains instructions for executing functions associated with electrical components 904, 906, and 908. While shown as being external to memory 910, it is to be understood that one or more of electrical components 904, 906, and 908 can exist within memory 910.

Figure 10:
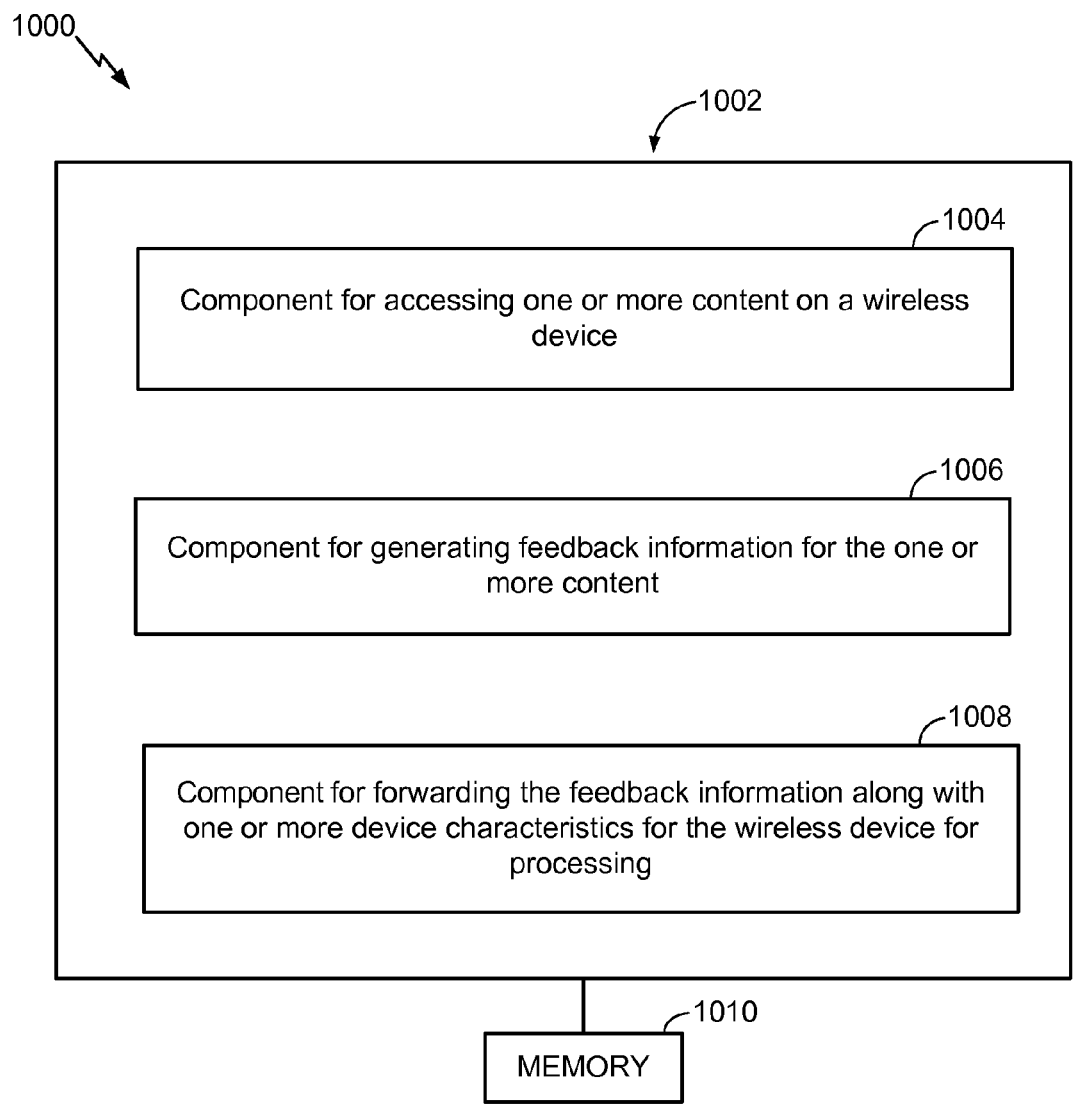
FIG. 10 is an example system that facilitates providing content feedback information in accordance with an aspect.

Referring now to FIG. 10, illustrated is a system 1000 configured to provide content feedback information. For example, system 1000 can reside at least partially within a transmitter, mobile device, etc. It is to be appreciated that system 1000 is represented as including functional blocks, which can be functional blocks that represent functions implemented by a processor, software, or combination thereof (e.g., firmware). System 1000 includes a logical grouping 1002 of electrical components that facilitate providing content feedback information. For instance, logical grouping 1002 may include component 1004 for accessing one or more content on a wireless device. Further, logical grouping 1002 may comprise component 1006 for generating feedback information for the one or more content. In addition, logical grouping 1002 may include component 1008 for forwarding the feedback information along with one or more device characteristics for the wireless device for processing. Additionally, system 1000 can include a memory 1010 that retains instructions for executing functions associated with electrical components 1004, 1006, and 1008. While shown as being external to memory 1010, it is to be understood that one or more of electrical components 1004, 1006, and 1008 can exist within memory 1010.

Figure 11:
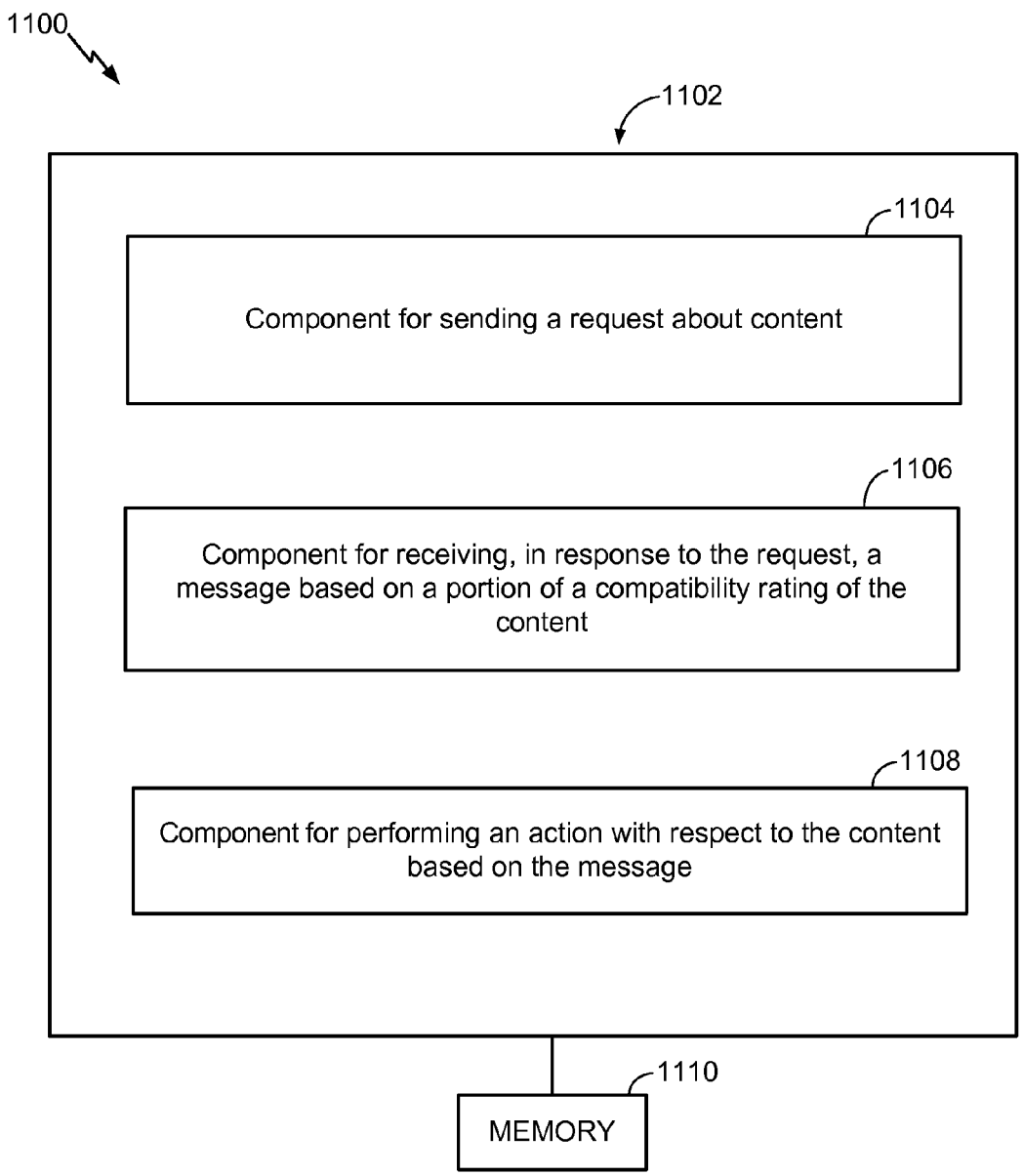
FIG. 11 is an example system that facilitates receiving compatible content in accordance with another aspect.

Referring now to FIG. 11, illustrated is a system 1100 configured to obtain information about compatible content. For example, system 1100 can reside at least partially within a transmitter, mobile device, etc. It is to be appreciated that system 1100 is represented as including functional blocks, which can be functional blocks that represent functions implemented by a processor, software, or combination thereof (e.g., firmware). System 1100 includes a logical grouping 1102 of electrical components that facilitate obtaining information about compatible content. For instance, logical grouping 1102 may include component 1104 for sending, by a wireless device having a first set of device characteristics, a request about content. Further, logical grouping 1102 may comprise component 1106 for receiving, in response to the request, a message based on a portion of a compatibility rating of the content, the compatibility rating being based on feedback information received from an other wireless device associated with the content, the other wireless device having a second set of device characteristics that includes a portion of the first set of device characteristics of the wireless device. In addition, logical grouping 1102 may include component 1108 for performing an action with respect to the content based on the message. Additionally, system 1100 can include a memory 1110 that retains instructions for executing functions associated with electrical components 1104, 1106, and 1108. While shown as being external to memory 1110, it is to be understood that one or more of electrical components 1104, 1106, and 1108 can exist within memory 1110.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, modules, and circuits described in connection with the implementations disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An example storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or implementations, it should be noted that various changes and modifications could be made herein without departing from the scope of the described aspects and/or implementations as defined by the appended claims. Furthermore, although elements of the described aspects and/or implementations may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method of managing content, comprising:
   receiving feedback information for content associated with a device having a set of device characteristics;
   determining a compatibility rating of the content based on the feedback information; and
   providing a message based on a portion of the compatibility rating of the content for an other device having a portion of the set of device characteristics.

2. The method of claim 1, further comprising making available the content for a requesting device having at least a portion of the set of device characteristics based upon the compatibility rating of the content in relationship to the set of device characteristics.

3. The method of claim 2, further comprising:
   applying a weighting to the feedback information or the compatibility rating based on the device from which the feedback information is received; and
   wherein making available the content for the requesting device is based upon the weighted feedback information or the weighted compatibility rating.

4. The method of claim 3, wherein applying the weighting comprises applying a relatively higher weight to the feedback information or the compatibility rating when the device from which the feedback information is received corresponds to a first user within a social network of a second user of the requesting device.

5. The method of claim 2, further comprising:
   determining a set of common device characteristics for executing the content;
   creating a group of devices based upon the set of common device characteristics; and
   determining an availability of the content for the group based on the compatibility rating and the set of common device characteristics; and
   wherein making available the content further comprises making available based on the availability of the content for the group when the requesting device is identified as a part of the group.

6. The method of claim 2, wherein making available the content further comprises filtering the content.

7. The method of claim 1, wherein the message comprises one or more of a list of one or more compatible content, a recommendation relating to an action to perform with respect to the content, a copy of the content, a stream including the content, a conversion of the content, a translation of the content, or an instruction to perform the action with respect to the content.

8. The method of claim 3, wherein the action includes at least one of deleting, uninstalling, upgrading, replacing, acquiring, copying, streaming, converting, translating, rendering, displaying, presenting, outputting, generating, or executing.

9. The method of claim 1, wherein the compatibility rating comprises one of a plurality of compatibility ratings for the content, with each of the plurality of compatibility ratings corresponding to a different one of a plurality of sets of device characteristics, wherein the one of the plurality of compatibility ratings corresponds to the one of the plurality of sets of device characteristics defining a closest match to a set of device characteristics of the other device.

10. The method of claim 1, wherein the compatibility rating is based on more than one of a plurality of compatibility ratings for the content, with each of the plurality of compatibility ratings corresponding to a different one of a plurality of sets of device characteristics.

11. The method of claim 1, wherein receiving the feedback information further includes receiving one or more of a user rating, a user review, content usage information, or content uninstall information.

12. The method of claim 1, wherein receiving the feedback information further includes receiving one or more of frequency of use information or duration of use information.

13. The method of claim 1, wherein receiving feedback information for the content further comprises receiving a user rating, and wherein determining the compatibility rating of the content further comprises:
   determining the content is compatible when the user rating exceeds a threshold level; and
   determining the content is not compatible when the user rating is below the threshold level.

14. The method of claim 1, wherein receiving feedback information for the content further comprises receiving a user review, and wherein determining the compatibility rating of the content further comprises:
   identifying one or more elements of the user review that define at least one of a compatible characteristic or an incompatible characteristic;
   determining the content is compatible when the one or more elements define one or more compatible characteristics exceeding a compatibility threshold level; and
   determining the content is not compatible when the one or more elements define one or more incompatible characteristics exceeding an incompatibility threshold level.

15. The method of claim 14, wherein the one or more elements of the user review comprise one or more keywords.

16. The method of claim 1, wherein receiving feedback information for the content further comprises receiving content uninstall information upon uninstalling the content, and wherein determining the compatibility rating of the content further comprises:
   determining the content is compatible when a timing of a content uninstall exceeds a uninstall time period threshold level; and
   determining the content is not compatible when the timing of the content uninstall is below the uninstall time period threshold level.

17. The method of claim 16, wherein receiving feedback information further comprises receiving user feedback associated with the content uninstall, and wherein determining the compatibility rating of the content further comprises:
   determining the content is compatible based upon the uninstall time period threshold level and the user feedback.

18. The method of claim 17, wherein the user feedback is selected from one or more uninstall messages presented to a user during the content uninstall.

19. The method of claim 18, wherein the one or more uninstall messages comprise one or more of the content did not function properly on the device, the device did not have a component used by the content, or the user did not like using the content on the device.

20. The method of claim 19, wherein the component comprises one or more of a camera, a global positioning system, wireless connection capability, and a particular screen size.

21. The method of claim 16, wherein receiving feedback information further comprises receiving content usage information, and wherein determining the compatibility rating of the content further comprises:
determining the content is compatible based upon the uninstall time period threshold level and the content usage information.

22. The method of claim 1, wherein receiving feedback information for the content further comprises receiving content usage information, and wherein determining the compatibility rating of the content further comprises:
determining the content is compatible when the content usage information is above a threshold level; and
determining the content is not compatible when the content usage information is below the threshold level.

23. The method of claim 22, wherein receiving the content usage information further comprises receiving periodically.

24. The method of claim 22, wherein receiving the content usage information further comprises receiving at least one of frequency of use information or duration of use information.

25. The method of claim 2, further comprising:
determining a ranking value of the content based on the feedback information;
ordering the content relative to one or more other content determined to be compatible with the requesting device based on the ranking value; and
providing an ordered presentation of available content to the requesting device based on the ordering of the content relative to one or more other content determined to be compatible with the requesting device.

26. The method of claim 1, wherein receiving the feedback information further comprises receiving a plurality of feedback information from a plurality of devices with at least a common portion of the set of device characteristics, and wherein determining the compatibility rating of the content is further based on the plurality of feedback information.

27. The method of claim 1, wherein the set of device characteristics comprises one or more of a device identification (ID), a device type or make or model, a device user interface configuration, a device processor configuration, a device software image, a device runtime environment or platform or operating system, a device location, a mobile country code (MCC), a mobile network code (MNC), and a device available memory capacity.

28. The method of claim 1, further comprising:
storing the compatibility rating of the content in relationship to the set of device characteristics.

29. At least one processor configured to manage content, comprising:
a first module for receiving feedback information for content associated with a device having a set of device characteristics;
a second module for determining a compatibility rating of the content based on the feedback information; and
a third module for providing a message based on a portion of the compatibility rating of the content for an other device having a portion of the set of device characteristics.

30. A non-transitory computer-readable medium comprising:
at least one instruction for causing a computer to receive feedback information for content associated with a device having a set of device characteristics;
at least one instruction for causing the computer to determine a compatibility rating of the content based on the feedback information; and
at least one instruction for causing the computer to provide a message based on a portion of the compatibility rating of the content for an other device having a portion of the set of device characteristics.

31. An apparatus, comprising:
means for receiving feedback information for content associated with a device having a set of device characteristics;
means for determining a compatibility rating of the content based on the feedback information; and
means for providing a message based on a portion of the compatibility rating of the content for an other device having a portion of the set of device characteristics.

32. An apparatus for managing content, comprising:
a feedback data store operable to receive feedback information for content associated with a device having a set of device characteristics;
a compatibility component operable to determine a compatibility rating of the content based on the feedback information; and
a message component operable to provide a message based on a portion of the compatibility rating of the content for an other device having a portion of the set of device characteristics.

33. The apparatus of claim 32, wherein the message component is further operable to make available the content for a requesting device having at least a portion of the set of device characteristics based upon the compatibility rating of the content in relationship to the set of device characteristics.

34. The apparatus of claim 33, wherein the compatibility component is further operable to apply a weighting to the feedback information or the compatibility rating based on the device from which the feedback information is received; and
wherein the message component is further operable to make available the content for the requesting device based upon the weighted feedback information or the weighted compatibility rating.

35. The apparatus of claim 34, wherein the compatibility component is further operable to apply a relatively higher weight to the feedback information or the compatibility rating when the device from which the feedback information is received corresponds to a first user within a social network of a second user of the requesting device.

36. The apparatus of claim 33, wherein the message component is further operable to determine a ranking value of the content based on the feedback information, order the content relative to one or more other content determined to be compatible with the requesting device based on the ranking value, and provide an ordered presentation of available content to the requesting device based on the ordering of the content relative to one or more other content determined to be compatible with the requesting device.

37. The apparatus of claim 33, wherein the message component is further operable to determine a set of common device characteristics for executing the content, create a group of devices based upon the set of common device characteristics, and determine an availability of the content for the group based on the compatibility rating and the set of common device characteristics, wherein the content is made available for the group when the requesting device is identified as part of the group.

38. The apparatus of claim 33, wherein the message component further comprises filtering the available content.

39. The apparatus of claim 32, wherein the message comprises one or more of a list of one or more compatible content, a recommendation relating to an action to perform with respect to the content, a copy of the content, a stream including the content, a conversion of the content, a translation of the content, or an instruction to perform the action with respect to the content.

40. The apparatus of claim 32, wherein the action includes at least one of deleting, uninstalling, upgrading, replacing, acquiring, copying, streaming, converting, translating, rendering, displaying, presenting, outputting, generating, or executing.

41. The apparatus of claim 32, wherein the compatibility rating comprises one of a plurality of compatibility ratings for the content, with each of the plurality of compatibility ratings corresponding to a different one of a plurality of sets of device characteristics, wherein the one of the plurality of compatibility ratings corresponds to the one of the plurality of sets of device characteristics defining a closest match to a set of device characteristics of the other device.

42. The apparatus of claim 32, wherein the compatibility rating is based on more than one of a plurality of compatibility ratings for the content, with each of the plurality of compatibility ratings corresponding to a different one of a plurality of sets of device characteristics.

43. The apparatus of claim 32, wherein the feedback information further includes receiving one or more of a user rating, a user review, content usage information, or content uninstall information.

44. The apparatus of claim 32, wherein the feedback information further includes receiving one or more of frequency of use information or duration of use information.

45. The apparatus of claim 32, wherein the feedback information further comprises receiving a user rating, and
wherein the compatibility component is further operable to determine the content is compatible when the user rating exceeds a threshold level, and determine the content is not compatible when the user rating is below the threshold level.

46. The apparatus of claim 32, wherein the feedback information further comprises receiving a user review, and
wherein the compatibility component is further operable to identify one or more elements of the user review that define at least one of a compatible characteristic or an incompatible characteristic, determine the content is compatible when the one or more elements define one or more compatible characteristics exceeding a compatibility threshold level, and determine the content is not compatible when the one or more elements define one or more incompatible characteristics exceeding an incompatibility threshold level.

47. The apparatus of claim 46, wherein the one or more elements of the user review comprise one or more keywords.

48. The apparatus of claim 32, wherein the feedback information further comprises receiving content uninstall information upon uninstalling the content, and wherein the compatibility component is further operable to determine the content is compatible when a timing of a content uninstall exceeds a uninstall time period threshold level; and determine the content is not compatible when the timing of the content uninstall is below the uninstall time period threshold level.

49. The apparatus of claim 48, wherein the feedback information further comprises receiving user feedback associated with the content uninstall, and wherein the compatibility component is further operable to determine the content is compatible based upon the uninstall time period threshold level and the user feedback.

50. The apparatus of claim 49, wherein the user feedback is selected from one or more uninstall messages presented to a user during the content uninstall.

51. The apparatus of claim 50, wherein the one or more uninstall messages comprise one or more of the content did not function properly on the device, the device did not have a component used by the content, or the user did not like using the content on the device.

52. The apparatus of claim 51, wherein the component comprises one or more of a camera, a global positioning system, wireless connection capability, and a particular screen size.

53. The apparatus of claim 48, wherein the feedback information further comprises receiving content usage information, and wherein the compatibility component is further operable to determine the content is compatible based upon the uninstall time period threshold level and the content usage information.

54. The apparatus of claim 32, wherein the feedback information for the content further comprises receiving content usage information, and
wherein the compatibility component is further operable to determine the content is compatible when the content usage information is above a threshold level, and determine the content is not compatible when the content usage information is below the threshold level.

55. The apparatus of claim 54, wherein the content usage information is received periodically.

56. The apparatus of claim 54, wherein the content usage information comprises receiving at least one of frequency of use information or duration of use information.

57. The apparatus of claim 32, wherein the feedback data store is further operable to receive a plurality of feedback information from a plurality of devices with at least a common portion of the set of device characteristics, and wherein the compatibility component is further operable to determine the compatibility rating of the content is further based on the plurality of feedback information.

58. The apparatus of claim 32, wherein the set of device characteristics comprises one or more of a device identification (ID), a device type or make or model, a device user interface configuration, a device processor configuration, a device software image, a device runtime environment or platform or operating system, a device location, a mobile country code (MCC), a mobile network code (MNC), and a device available memory capacity.

59. The apparatus of claim 32, further comprising a data store operable to store the compatibility rating of the content in relationship to the set of device characteristics.

* * * * *